United States Patent
Uchino et al.

(10) Patent No.: US 10,313,908 B2
(45) Date of Patent: Jun. 4, 2019

(54) USER APPARATUS AND MEASUREMENT CONTROL METHOD

(71) Applicant: NTT DOCOMO, INC., Tokyo (JP)

(72) Inventors: Tooru Uchino, Tokyo (JP); Kunihiko Teshima, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 96 days.

(21) Appl. No.: 15/502,218

(22) PCT Filed: Aug. 7, 2015

(86) PCT No.: PCT/JP2015/072506
§ 371 (c)(1),
(2) Date: Feb. 7, 2017

(87) PCT Pub. No.: WO2016/024540
PCT Pub. Date: Feb. 18, 2016

(65) Prior Publication Data
US 2017/0238204 A1    Aug. 17, 2017

(30) Foreign Application Priority Data
Aug. 11, 2014    (JP) .................................. 2014-163987

(51) Int. Cl.
*H04W 24/10*    (2009.01)
*H04W 72/04*    (2009.01)
(Continued)

(52) U.S. Cl.
CPC .......... *H04W 24/10* (2013.01); *H04W 48/16* (2013.01); *H04W 72/0446* (2013.01); *H04W 76/28* (2018.02); *Y02D 70/00* (2018.01)

(58) Field of Classification Search
CPC .......... H04W 72/0446; H04W 76/048; H04W 24/10; H04W 72/04; H04W 48/16; H04W 52/02; H04L 5/0098
See application file for complete search history.

(56) References Cited

U.S. PATENT DOCUMENTS

2011/0195706 A1* 8/2011 Nakamori ............. H04W 24/10
455/423
2016/0100355 A1* 4/2016 Chen ..................... H04W 8/005
370/232

OTHER PUBLICATIONS

Extended European Search Report issued in the counterpart European Patent Application No. 15832153.9, dated May 23, 2017 (10 pages).

(Continued)

*Primary Examiner* — Mewale A Ambaye
(74) *Attorney, Agent, or Firm* — Osha Liang LLP

(57) ABSTRACT

A user apparatus for use in a mobile communication system, including: determination means configured to determine whether the user apparatus can take both states of a discontinuous reception state and a non-discontinuous reception state at the same time; and measurement control means configured, if it is determined that the user apparatus can take both states of a discontinuous reception state and a non-discontinuous reception state at the same time by the determination means, to determine which measurement condition to use for performing measurement between a measurement condition for when in a discontinuous reception state and a measurement condition for when in a non-discontinuous reception state, and to perform measurement using a determined measurement condition.

3 Claims, 11 Drawing Sheets

(51) Int. Cl.
H04W 48/16 (2009.01)
H04W 76/28 (2018.01)

(56) References Cited

OTHER PUBLICATIONS

Huawei, et al.; "DRX coordination in dual connectivity"; 3GPP TSG-RAN WG2 Meeting #85, R2-140080; Prague, Czech Republic, Feb. 10-14, 2014 (3 pages).
Samsung; "Intra-/Inter-frequency measurements for Dual Connectivity"; 3GPP TSG RAN WG2 #86, R2-142278; Seoul, Korea, May 19-23, 2014 (3 pages).
Intel Corporation; "Discussion on SFN timing difference in Dual connectivity"; 3GPP TSG-RAN WG4 Meeting #71, R4-143028; Seoul, Korea, May 19-23, 2014 (7 pages).
NTT Docomo, Inc.; "Introduction of Dual Connectivity"; 3GPP TSG-RAN WG2 #86, R2-142676; Seoul, Korea, May 19-23, 2014 (59 pages).
Office Action issued in the counterpart European Patent Application No. 15832153.9, dated May 15, 2018 (6 pages).
International Search Report issued in corresponding application No. PCT/JP2015/072506 dated Sep. 15, 2015 (4 pages).
Written Opinion of the International Searching Authority issued in corresponding application No. PCT/JP2015/072506 dated Sep. 15, 2015 (4 pages).
3GPP TS 36.133 V12.4.0, "3rd Generation Partnership Project; Technical Specification Group Radio Access Network; Evolved Universal Terrestrial Radio Access (E-UTRA); Requirements for support of radio resource management (Release 12)"; Jul. 2014 (870 pages).
3GPP TS 36.321 V12.2.1, "3rd Generation Partnership Project; Technical Specification Group Radio Access Network; Evolved Universal Terrestrial Radio Access (E-UTRA); Medium Access Control (MAC) protocol specification (Release 12)"; Jun. 2014 (57 pages).
3GPP TS 36.331 V12.1.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (356 pages).
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)"; Dec. 2013 (71 pages).
NTT Docomo, Inc., "Measurement requirements with multiple DRX configurations for Dual Connectivity"; 3GPP TSG-RAN WG4 #72, R4-144407; Dresden, Germany; Aug. 18-22, 2014 (4 pages).

* cited by examiner

Non-DRX STATE

BOTH ARE IN DRX, BUT, DRX cycle IS DIFFERENT

BASED ON DRX/Non-DRX STATE OF MCG
or
BASED ON DRX/Non-DRX STATE OF SCG

BASED ON DRX/Non-DRX STATE OF
CG THAT MEETS PREDETERMINED CONDITION

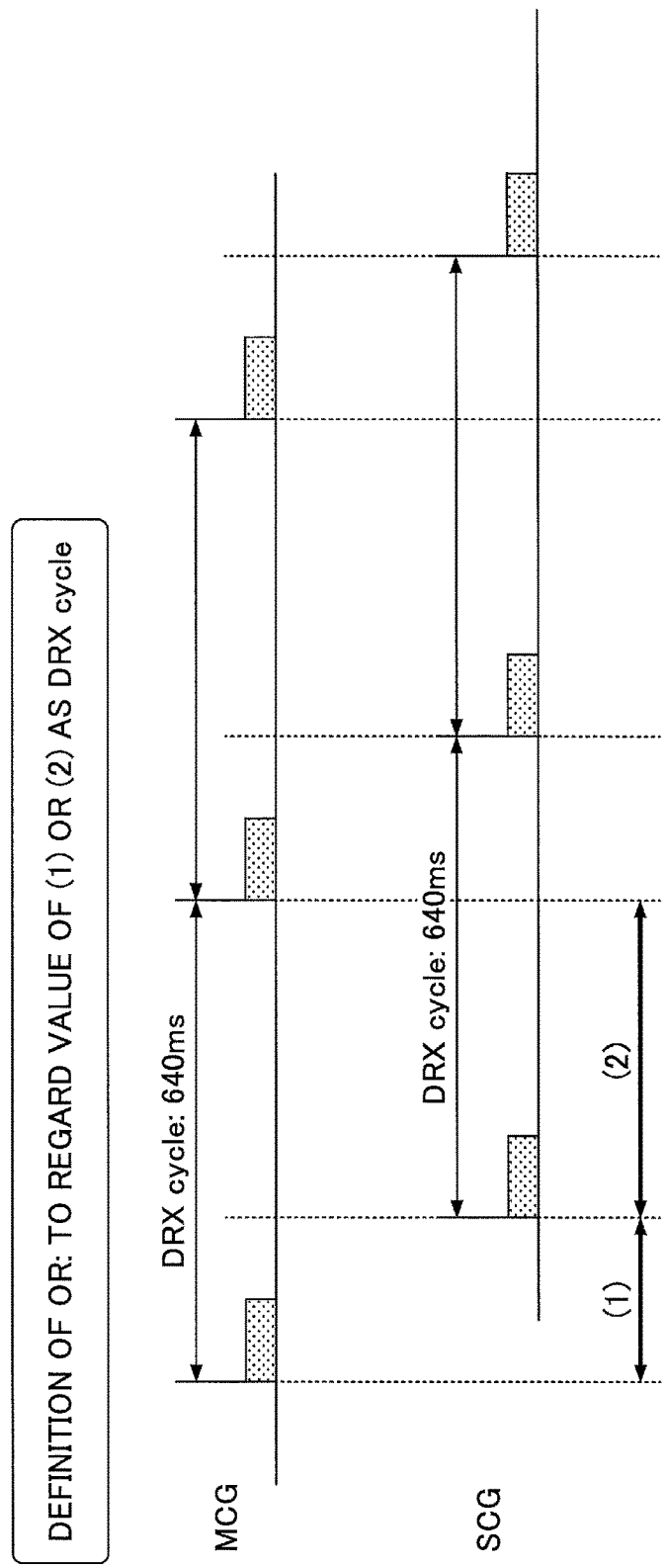

BASED ON DRX CONFIGURATION OF MCG
or
BASED ON DRX CONFIGURATION OF SCG

BASED ON DRX CONFIGURATION OF
CG THAT MEETS PREDETERMINED CONDITION

USER APPARATUS AND MEASUREMENT CONTROL METHOD

TECHNICAL FIELD

The present invention relates to a measurement control method executed by a user apparatus in a mobile communication system.

BACKGROUND ART

In an LTE system, carrier aggregation (CA: carrier aggregation) for performing communication by simultaneously using a plurality of carries is adopted, in which a predetermined bandwidth (20 MHz at the maximum) is used as a basic unit. In carrier aggregation, a carrier which is a basic unit is called a component carrier (CC: component carrier).

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell supporting RLM (Radio Link Monitoring) and SPS (Semi-Persistent Scheduling) and the like.

The SCell is a cell which is set in the user apparatus UE by being added to the PCell. Addition and deletion of an SCell can be performed by RRC (Radio Resource Control) signaling. Since SCell is in an deactivated state right after it is set in the user apparatus UE, communication becomes available (scheduling becomes available) only by activating it.

As shown in FIG. 1, in CA up to Rel-10 of LTE, a plurality of CCs under the same base station eNB are used.

On the other hand, in Rel-12, this is further expanded so that Dual connectivity is proposed in which simultaneous communication is performed by using CCs under different base stations eNB to realize high throughputs (non-patent document 1). That is, in Dual connectivity, the UE performs communication simultaneously using radio resources of two physically different base stations eNB.

Dual connectivity is a kind of CA, and it is also referred to as Inter eNB CA (inter-base station carrier aggregation), in which Master-eNB (MeNB) and Secondary-eNB (SeNB) are introduced. FIG. 2 shows an example of Dual connectivity. In the example of FIG. 2, an MeNB communicates with the user apparatus UE by a CC#1, and the SeNB communicates with the user apparatus UE by a CC#2 so that Dual connectivity (to be referred to as DC hereinafter) is realized.

In DC, a cell group formed by cell(s) (one or a plurality of cells) under an MeNB is called MCG (Master Cell Group), and a cell group formed by cell(s) (one or a plurality of cells) under an SeNB is called SCG (Secondary Cell Group). An UL CC is set in at least one SCell in an SCG, and PUCCH is set in one of the at least one SCell. The SCell is called PSCell (primary SCell). An SCell added first in an SCG is the PSCell. Note that it is being considered, in also CA which is not DC, to set a PUCCH in an SCell.

By the way, in LTE, for the purpose of reducing power consumption in the user apparatus UE, DRX (Discontinuous reception) is defined (non-patent document 2). In DRX, as shown in FIGS. 3A and 3B, the state changes from a non-DRX state for always trying reception of a signal (PDCCH) to a DRX state for periodically performing discontinuous reception of a signal when there is no communication for a predetermined time. Configuration information (configuration) of cycle, reception period and the like related to DRX is notified from the base station eNB to the user apparatus UE by an RRC signal and the like.

In communication of a single carrier which is not CA and in CA up to Rel-10, the base station eNB performs single DRX configuration for the user apparatus. On the other hand, in the above-mentioned Dual Connectivity, the MeNB and the SeNB can perform DRX configuration for the user apparatus UE independently. That is, DRX configurations that are different between the MeNB and the SeNB can be made, so that the user apparatus UE manages states of DRX independently for each of them. That is, in the user apparatus UE, a DRX state and a non-DRX state can be taken at the same time.

On the other hand, in LTE, it is defined that the user apparatus UE measures quality (RSRP, RSRQ and the like) of serving cells and neighbor cells to report the quality to the base station eNB in terms of cell selection processing at the time of handover, and CC addition/deletion/change processing in CA/DC. This is called measurement.

As to measurement, in LTE, as measurement conditions (requirements), allowable time until measurement completes and the like are specified (non-patent document 3). In the specification, different measurement conditions are specified depending on whether the user apparatus UE is in a DRX state or in a non-DRX state. Also, a measurement condition that should be satisfied when in DRX is specified depending on a cycle of DRX (to be referred to as DRX cycle hereinafter).

RELATED ART DOCUMENT

Non Patent Document

[NON PATENT DOCUMENT 1] 3GPP TR 36.842 V12.0.0 (2013-12)
[NON PATENT DOCUMENT 2] 3GPP TS 36.321 V12.2.1 (2014-06)
[NON PATENT DOCUMENT 3] 3GPP TS 36.133 V12.4.0 (2014-07)
[NON PATENT DOCUMENT 4] 3GPP TS 36.331 V12.1.0 (2014-03)

SUMMARY OF THE INVENTION

Problem to be Solved by the Invention

In the specification on measurement up to Rel-11, the user apparatus UE is configured with a single DRX configuration, so that it is presupposed that the user apparatus UE manages a single DRX state. That is, there is no rule for the case where the user apparatus UE is configured with a plurality of DRX configurations like in Dual connectivity or for the case where the user apparatus UE manages a plurality of DRX states. Therefore, measurement operation of the user apparatus UE in Dual Connectivity is not ensured, so that there is a possibility in that Dual Connectivity cannot be operated properly.

For example, as shown in FIG. 4A, in the case where the user apparatus UE is in a DRX state in communications with the MeNB, and is in a non-DRX state in communications with the SeNB, it is unclear, for the user apparatus UE, whether to perform measurement according to a condition for when in DRX or to perform measurement according to a condition for when in non-DRX. Also, as shown in FIG. 4B, in the case where both of the MeNB and the SeNB are in a DRX state, when a DRX cycle of communication with the MeNB is 640 ms and a DRX cycle of communication with the SeNB is 1280 ms, although the user apparatus UE performs measurement in accordance with a condition for when in DRX, it is unclear whether to adopt 640 ms or to adopt 1280 ms as a DRX cycle on which the measurement condition is based.

The present invention is contrived in view of the above-mentioned points, and an object of the present invention is to provide a technique that enables the user apparatus to properly perform measurement even when both states of a discontinuous reception state and a non-discontinuous reception state can be taken simultaneously.

Means for Solving the Problem

According to an embodiment of the present invention, there is provided a user apparatus for use in a mobile communication system, including:

determination means configured to determine whether the user apparatus can take both states of a discontinuous reception state and a non-discontinuous reception state at the same time; and measurement control means configured, if it is determined that the user apparatus can take both states of a discontinuous reception state and a non-discontinuous reception state at the same time by the determination means, to determine which measurement condition to use for performing measurement between a measurement condition for when in a discontinuous reception state and a measurement condition for when in a non-discontinuous reception state, and to perform measurement using a determined measurement condition.

According to an embodiment of the present invention, there is provided a measurement control method performed by a user apparatus for use in a mobile communication system, including:

a determination step of determining whether the user apparatus can take both states of a discontinuous reception state and a non-discontinuous reception state at the same time; and a measurement control step of, if it is determined that the user apparatus can take both states of a discontinuous reception state and a non-discontinuous reception state at the same time by the determination step, determining which measurement condition to use for performing measurement between a measurement condition for when in a discontinuous reception state and a measurement condition for when in a non-discontinuous reception state, and performing measurement using a determined measurement condition.

Effect of the Present Invention

According to an embodiment of the present invention, it becomes possible that the user apparatus properly performs measurement even when both states of a discontinuous reception state and a non-discontinuous reception state can be taken simultaneously.

BRIEF DESCRIPTION OF THE DRAWINGS

FIG. 11 is a diagram for explaining a determination example 2-1 in the determination control operation 2.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although description is provided by taking Dual connectivity as an example in the present embodiment, the present invention can be applied not only to Dual connectivity but also to cases where the user apparatus UE can take both states of a DRX state and a non-DRX state simultaneously.

Also, although the present embodiment is targeted for a mobile communication system of LTE, the present invention can be applied not only to LTE but also to other mobile communication systems. Also, in the specification and the claims, the term "LTE" is used to mean Rel-12 of 3GPP, or schemes after Rel-12 unless otherwise stated. Note that, when the present invention is applied to LTE, Rel of LTE is not limited to Rel-12 or Rels after Rel-12.

(System Configuration)

Figure 1:
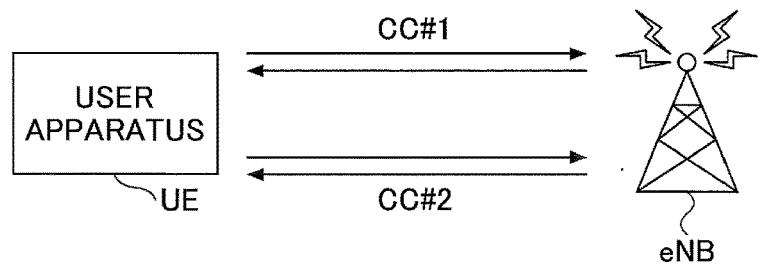
FIG. 1 is a diagram showing CA up to Rel-10.
Figure 2:
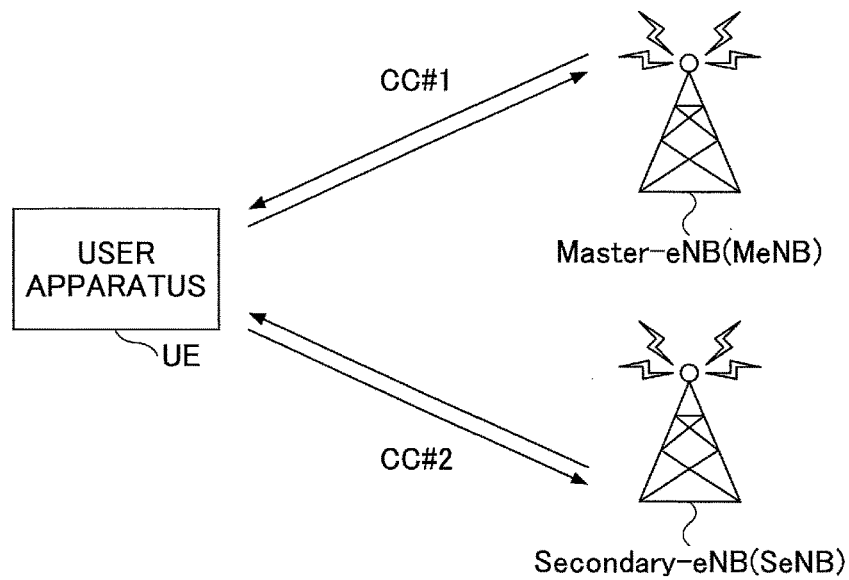
FIG. 2 is a diagram showing an example of Dual connectivity.
Figure 3A:
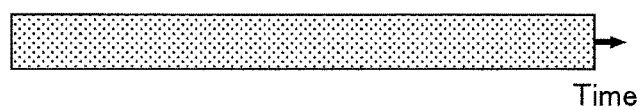
FIG. 3A is a diagram for explaining DRX.
Figure 3B:
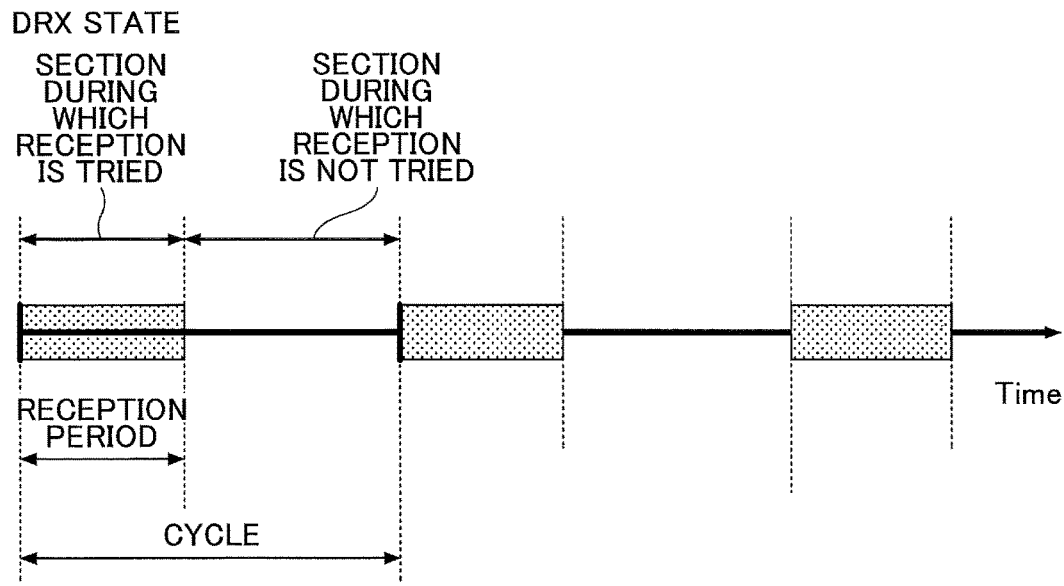
FIG. 3B is a diagram for explaining DRX.
Figure 4A:
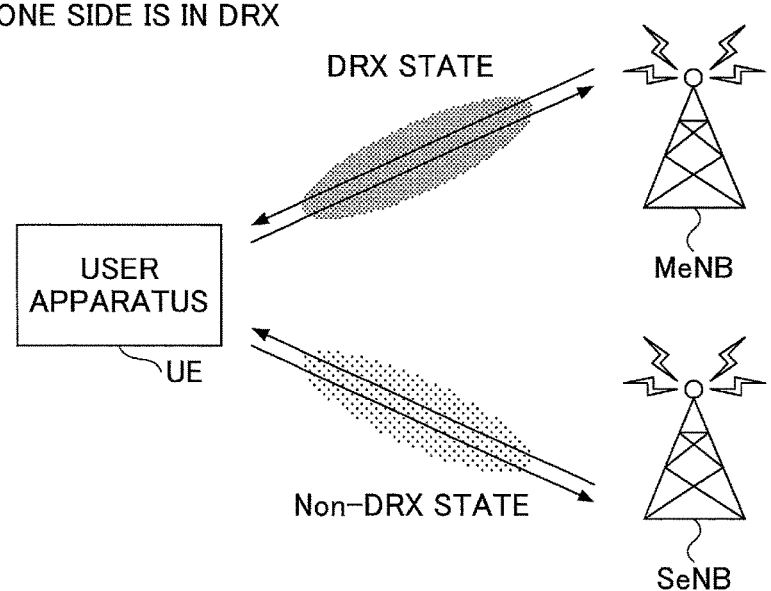
FIG. 4A is a diagram for explaining a problem.
Figure 4B:
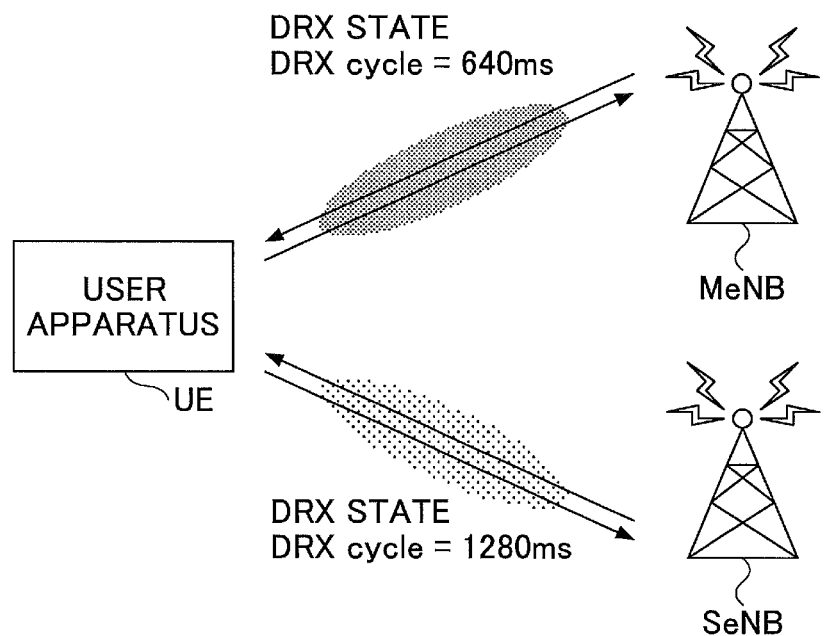
FIG. 4B s a diagram for explaining a problem.
Figure 5:
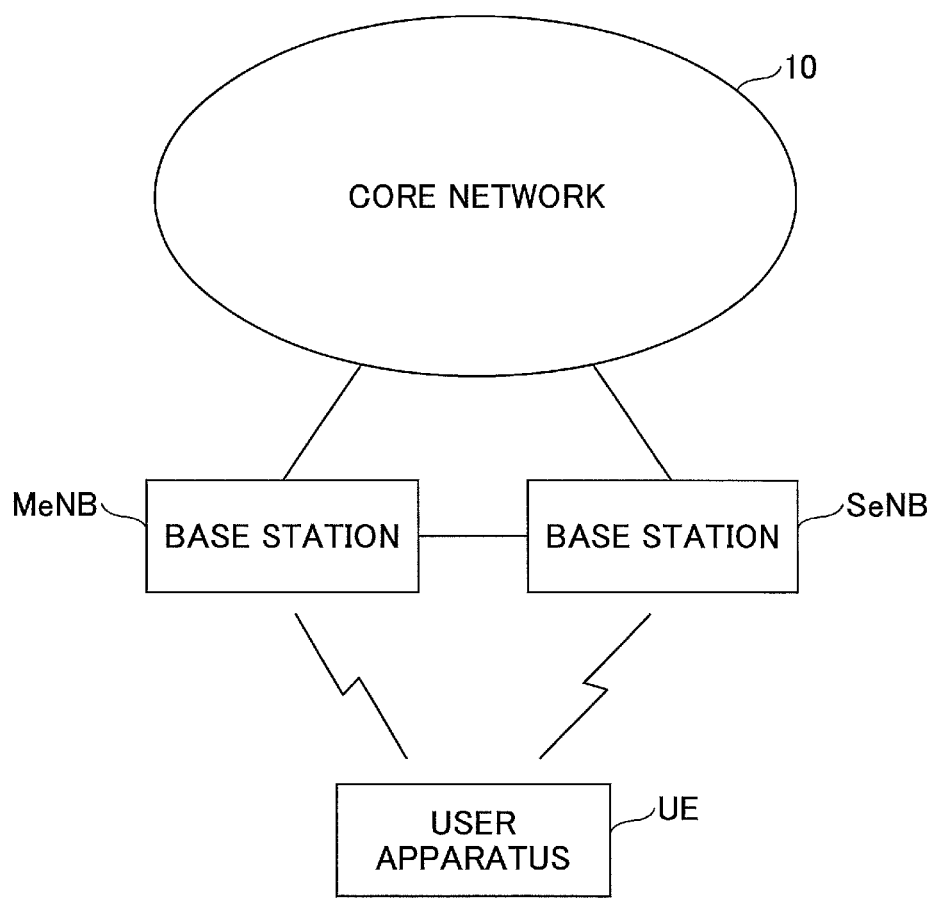
FIG. 5 is a diagram showing a configuration example of a communication system of an embodiment of the present invention.

FIG. 5 shows a configuration example of a communication system of an embodiment of the present invention. As shown in FIG. 5, the communication system of the present embodiment includes a base station MeNB and a base station SeNB each connected to a core network 10, which enables DC between the base station MeNB/base station SeNB and the user apparatus UE. Also, communication is available between the base station MeNB and the base station SeNB by an X2 interface, for example. In the following, the base station MeNB and the base station SeNB are described as MeNB and SeNB respectively. Also, when collectively mentioning a base stations including MeNB, SeNB, eNB which is not DC and the like, there is a case where it is described as a base station eNB.

In the communication system shown in FIG. 5, for example, a PCell and SCells (including PSCell) can be configured in which an MCG is a macro cell and an SCG is a small cell, for example. Addition, deletion, configuration change of an SCell (including PSCell) in the user apparatus UE is performed by RRC signaling from the MeNB. However, it is not limited to this. Also, a DRX configuration for communication between the MeNB and the user apparatus UE, and a DRX configuration for communication between the SeNB and the user apparatus UE are notified from the MeNB to the user apparatus, for example, by an RRC signaling, so that they are configured.

Also, in an MCG, the same DRX configuration is applied to each cell, so that each cell activated in the MCG takes the same DRX/non-DRX state. Similarly, in an SCG, the same DRX configuration is applied to each cell, so that each cell activated in the SCG takes the same DRX/non-DRX state. Between the MCG and the SCG, DRX configurations and DRX/non-DRX states are independent. That is, both states of a DRX state and a non-DRX state can be taken at the same time in the user apparatus UE.

In the present embodiment, in the user apparatus UE, a DRX configuration of an MCG and a DRX configuration of an SCG are set, and also, the user apparatus UE separately manages a DRX/non-DRX state in the MCG and a DRX/non-DRX state in the SCG. Also, the number of CGs is not limited to two. For example, a plurality of SCGs may exist.

(Determination Control Operation Flow)

Figure 6:
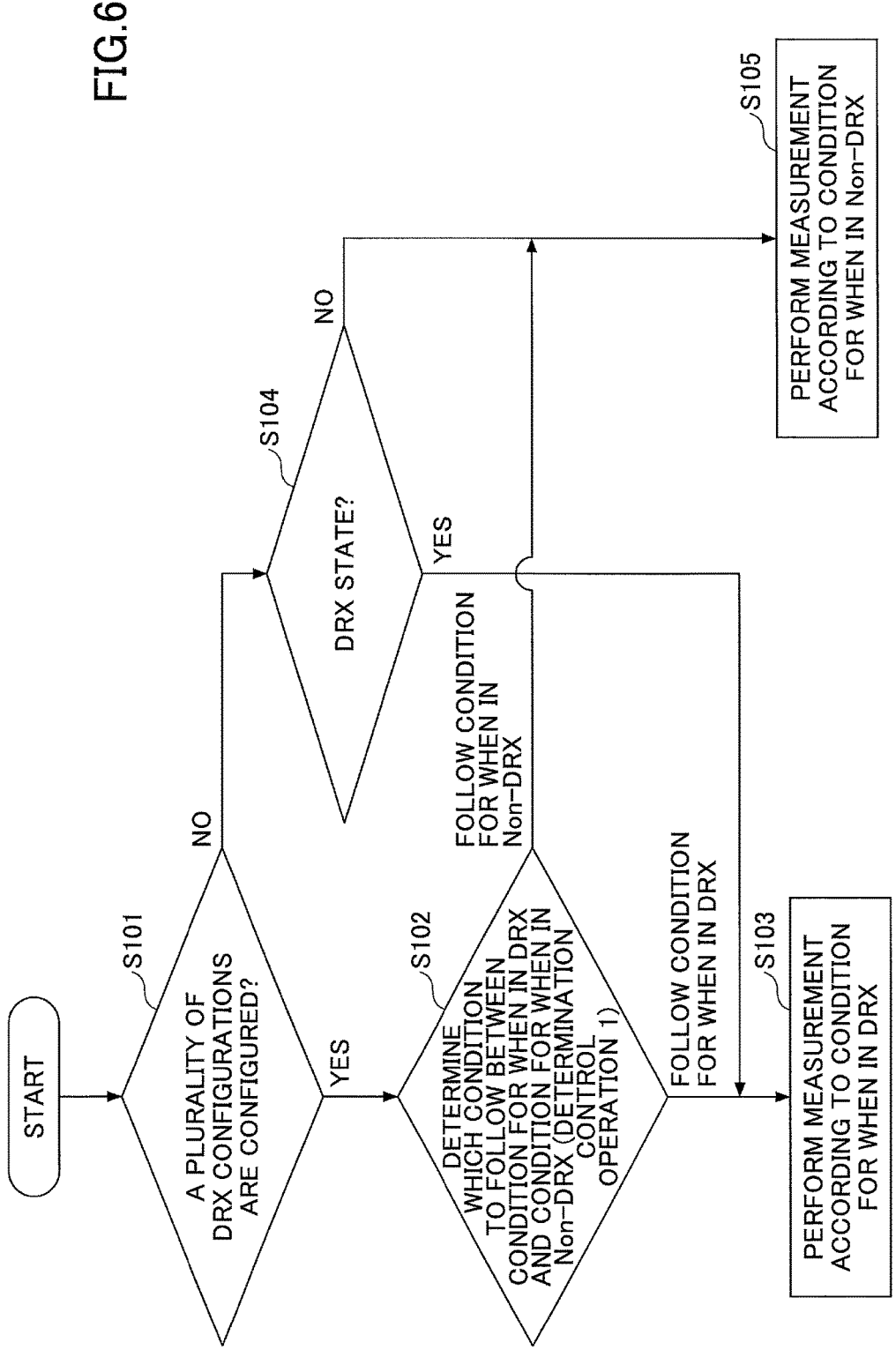
FIG. 6 is a flowchart showing determination control operation in an embodiment of the present invention.
Figure 7:
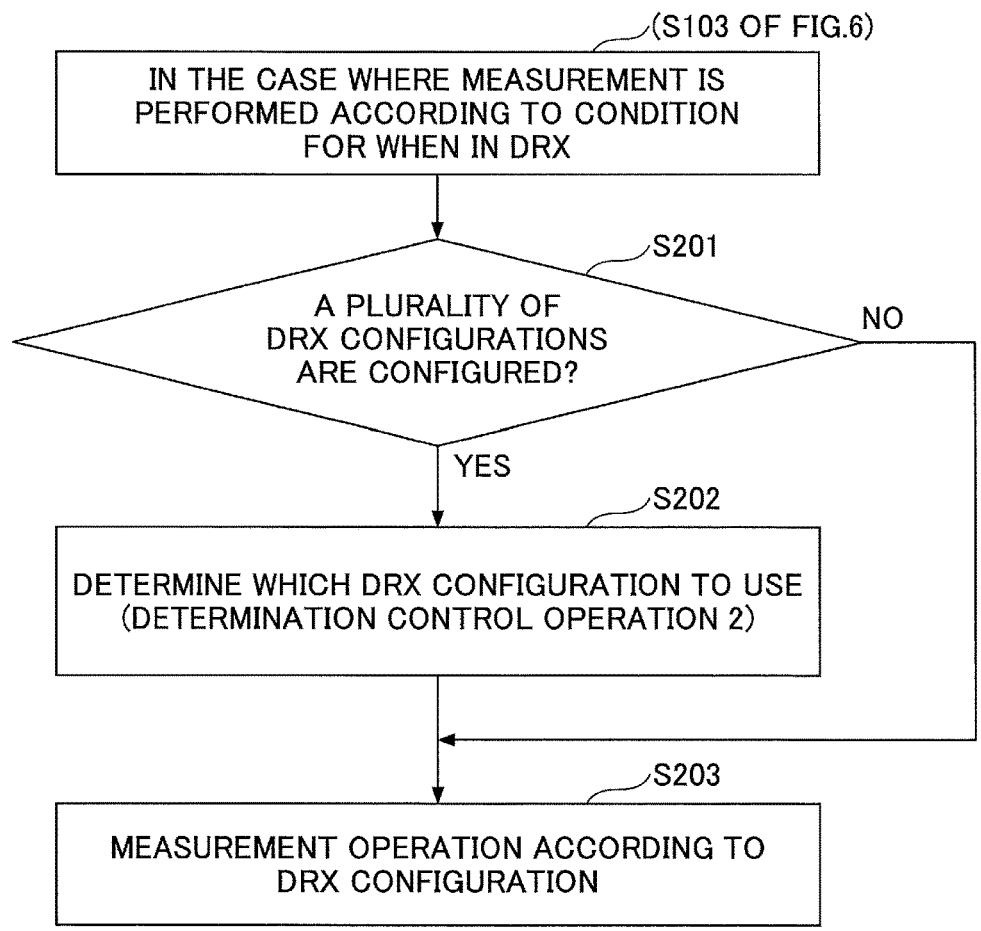
FIG. 7 is a flowchart showing determination control operation when performing measurement according to a condition for when in DRX in an embodiment of the present invention.

Next, with reference to FIG. 6 and FIG. 7, examples of determination control operations in an user apparatus UE are described.

FIG. 6 is a flowchart showing operation for determining which state's condition based on which the user apparatus UE performs measurement in the case where the user apparatus UE can take both of a DRX state and a non-DRX state at the same time.

First, the user apparatus UE determines whether a plurality of DRX configurations are configured (step 101). To determine whether a plurality of DRX conditions are configured is an example of determining whether both states of a DRX state and a non-DRX state can be taken simultaneously. When a plurality of DRX configurations are configured, it can be determined that both states of the DRX state and the non-DRX state can be taken at the same time.

When a plurality of DRX configurations are configured (Yes in step 101), the process goes to step 102, so that the user apparatus UE determines which measurement condition to use for performing measurement, between a measurement condition for when in DRX and a measurement condition for when in non-DRX. An example of the determination method in step 102 is described later as a determination control operation 1.

In step 102, when following the measurement condition for when in DRX, the process goes to step 103, so that measurement is performed according to the measurement condition for when in DRX. In step 102, when following the measurement condition for when in non-DRX, the process goes to step 105, so that measurement is performed according to the measurement condition for when in non-DRX.

If a plurality of DRX configurations are not configured in step 101 (No in step 101), the process goes to step 104. Then, if the user apparatus UE is in a DRX state (Yes in step 104), the user apparatus UE performs measurement according to the measurement condition for when in DRX (step 103). On the other hand, if the user apparatus UE is in a non-DRX state (No in step 104), the user apparatus UE performs measurement according to the measurement condition for when in non-DRX (step 105).

FIG. 7 is a flowchart showing determination control operation when the user apparatus UE performs measurement based on a measurement condition for when in DRX.

In the case where the user apparatus UE performs measurement based on a measurement condition for when in DRX, when the user apparatus UE is configured with a plurality of DRX configurations (Yes in step 201), the user apparatus UE determines which DRX configuration (DRX cycle, more specifically) to use (step 202), so that the user apparatus UE performs measurement by using the DRX configuration (step 203). An example of a determination method in step 202 is described later as a determination control operation 2.

On the other hand, in the case where the number of DRX configuration configured in the user apparatus UE is one (No in step 201), the user apparatus UE performs measurement according to the DRX configuration (step 203).

(Concrete Determination Example in Determination Control Operation 1)

Next, a concrete determination example is described in the determination of step 102 of FIG. 6, that is, in the determination control operation 1 for determining, in the case where a plurality of DRX configurations are set (that is, both of a DRX state and a non-DRX state can be taken at the same time), which measurement condition to follow between a measurement condition for when in DRX and a measurement condition for when in non-DRX for performing measurement.

<Determination Example 1-1>

Figure 8:
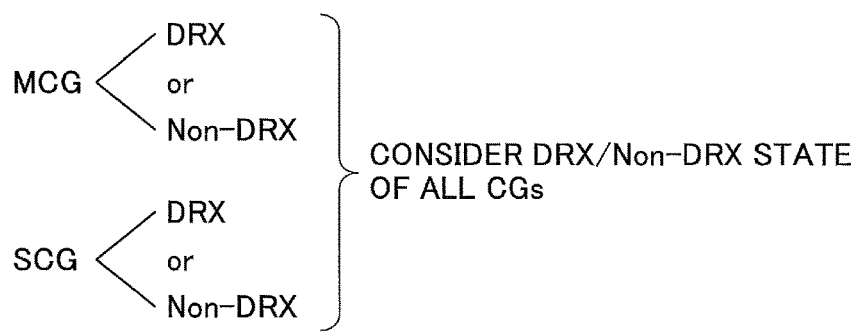
FIG. 8 is a diagram for explaining a determination example 1-1 in the determination control operation 1.

In the determination example 1-1, the user apparatus UE performs measurement using a measurement condition that is determined based on DRX/non-DRX states at the time of determination in all CGs (cell groups). That is, as shown in FIG. 8, the MCG can take either a DRX state or a non-DRX state, and also, the SCG can take either a DRX state or a non-DRX state. In the determination example 1-1, the user apparatus UE determines whether to perform measurement based on a measurement condition for when in DRX or to perform measurement based on a measurement condition for when in non-DRX in consideration of the states of all these CGs.

More specifically, for example, if the state of every CG is a DRX state, the user apparatus UE performs measurement based on a measurement condition for when in DRX, and if at least one CG is in a non-DRX state, the user apparatus UE performs measurement based on a measurement condition for when in non-DRX.

Also, if at least X (X is an integer equal to or greater than 1) CG(s) is (are) in a DRX state, the user apparatus UE may perform measurement based on a measurement condition for when in DRX, and if the number of CGs in a DRX state is less than X and the state of the remaining CGs is a non-DRX state, the user apparatus UE may perform measurement based on a condition for when in non-DRX. Here, for example, X may be fixed to 1 or the user apparatus UE may autonomously determine X based on configured number of CGs, or X may be instructed from the NW (example: MeNB).

<Determination Example 1-2>

Next, the determination example 1-2 is described. In the determination example 1-2, the user apparatus UE performs measurement based on a DRX/non-DRX state in a specific CG.

<Determination Example 1-2(a)>

Figures 9A, 9B, 9C:
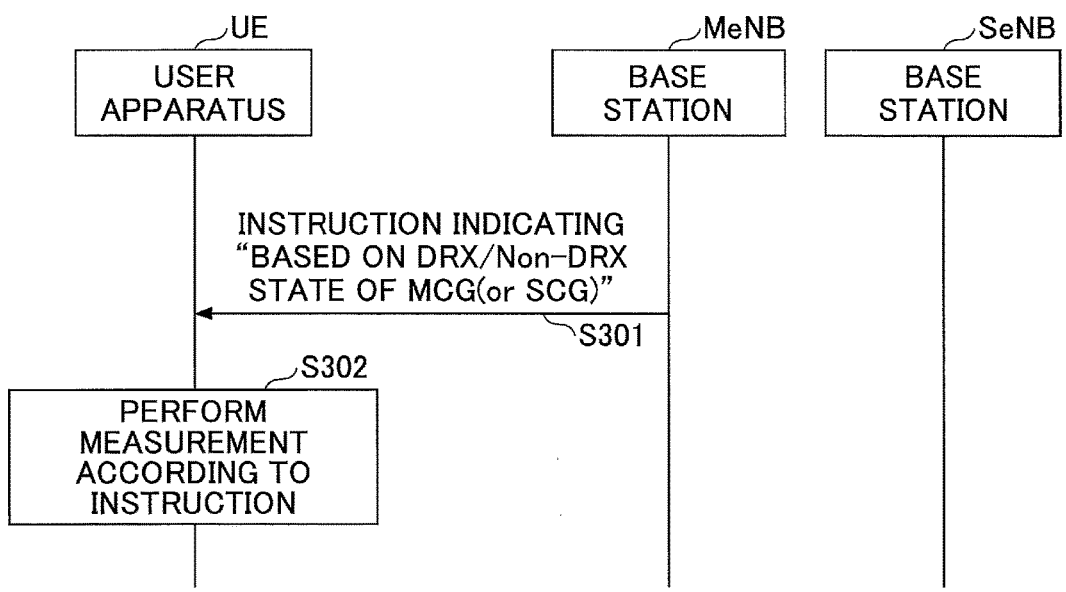
FIG. 9A is a diagram for explaining a determination example 1-2 in the determination control operation 1.
FIG. 9B is a diagram for explaining a determination example 1-2 in the determination control operation 1.
FIG. 9C is a diagram for explaining a determination example 1-2 in the determination control operation 1.

As shown in FIG. 9A, a rule is defined in a fixed manner, in which, for example, measurement is performed based on a state of an MCG at the time of determination, or, measurement is performed based on a state of an SCG, so that measurement is performed according to the rule. This method is advantageous in that determination control becomes easy.

<Determination Example 1-2(b)>

Also, the user apparatus UE may perform measurement based on a DRX/non-DRX state, of a CG designated from the NW, at the time of determination. FIG. 9B is a sequence example in the case where instruction is performed from the MeNB. In step 301, the MeNB transmits, to the user apparatus UE, an instruction indicating which CG's state to follow. In step 302, the user apparatus UE executes measurement according to the instruction. In FIG. 9B, as an example, although the instruction is transmitted from the MeNB, the instruction may be transmitted from the seNB.

The notification of the instruction may be performed semi-statically by an RRC signal, or may be dynamically performed by a MAC/PHY signal. When there is no instruction from the NW, the user apparatus UE may select a default CG (example: MCG) as shown in FIG. 9A.

<Determination Example 1-2 (c)>

Also, as shown in FIG. 9C, the user apparatus UE may perform measurement based on a DRX/non-DRX state of a CG that matches a predetermined condition. Some concrete examples here are described below. Note that, an example in which determination is made based on a purpose of reporting as described later is an example for selecting a CG that matches a predetermined condition.

The user apparatus UE may perform measurement based on a DRX/non-DRX state of a CG in which a specific DRX configuration is set. For example, the user apparatus UE performs measurement using a measurement condition based on a DRX/non-DRX state of a CG in which the DRX-cycle is the longest (or shortest) among a plurality of CGs.

Also, the user apparatus UE may perform measurement based on a DRX/non-DRX state of a CG in which a specific bearer is configured. For example, the user apparatus UE performs measurement using a measurement condition based on a DRX/non-DRX state of a CG that is configured with a bearer of the highest QoS among a plurality of CGs.

Also, the user apparatus UE may perform measurement using a measurement condition based on a DRX/non-DRX state of a CG in which the traffic amount is the largest among a plurality of CGs. In this example using the traffic amount, any method can be used as a method for calculating the traffic amount. For example, the user apparatus UE can calculate a traffic amount by measuring data amount (example: buffered data amount), non-DRX state period, Activate time of SCell, TA timer running period, resource assignment number of times and the like of each CG. Alternatively, a CG where a period from the last scheduling timing is shorter than a predetermined period may be determined as a CG where traffic amount is large.

Also, the user apparatus UE may perform measurement using a measurement condition based on a DRX/non-DRX state of a CG having a cell of the best quality (RSRQ, RSRP and the like) among all CGs.

Also, the user apparatus UE may perform measurement using a measurement condition based on a DRX/non-DRX state of a CG that includes a specific cell. The specific cell may be, for example, a PCell, may be a specific SCell, or, may be a cell of a specific duplex mode (frame structure). The specific SCell is, for example, a PSCell, an SCell that is configured with a PUCCH, and the like. The specific duplex mode is TDD or FDD.

Also, the user apparatus UE may perform measurement by using a measurement condition based on a DRX/non-DRX state of a CG that is configured first or a CG that is configured last.

Also, the user apparatus UE may perform measurement by using a measurement condition based on a DRX/non-DRX state of a CG whose CG identifier (CG index) is the smallest/the largest. Note that, in the case where the number of CGs becomes equal to or greater than three, it is assumed that an identifier (CG index) is provided for each CG. However, even when the number of CGs is two, an identifier (CG index) may be provided for each CG.

Also, the user apparatus UE may perform measurement by using a measurement condition based on a DRX/non-DRX state of a specific CG that is determined based on a purpose of reporting. As an example for performing determination based on a purpose of reporting, there is an example in which a CG is selected based on an event (Event) type. In the following, this example is described.

<<Determination Example 1-2(c), an Example Using Event>>

In CA (including DC), it is possible that, the user apparatus UE measures reception quality (RSRP, RSRQ and the like) of a serving cell and a neighbor cell for each CC (cell), so that, when a specific condition (event) is satisfied, the user apparatus UE performs reporting to the base station eNB.

That is, the user apparatus UE of the present embodiment measures reception quality of a downlink of a cell, and reports a measurement result to the base station based on s specific event, so that the user apparatus UE can perform addition, deletion, change and the like of the cell. The base station eNB (example: MeNB in DC) transmits, to the user apparatus UE, an RRC signal (example: RRCConnectionReconfiguration message) including measurement configuration information so as to perform configuration (measurement configuration), for the user apparatus UE, indicating what the user apparatus UE measures (RSRP, RSRQ or the like) by which frequency (CC), what condition (event) as a trigger to use and what information to include for performing result reporting, or the like.

Here, for explaining the present example in which an event is used, a basic matter in measurement configuration is described (refer to non-patent document 4, for example). Measurement configuration information to be transmitted to the user apparatus UE from the base station eNB by an RRC signal includes measurement object (Measurement object), reporting configuration information (Reporting configuration), and measurement ID (Measurement identity).

The measurement object includes a target to measure such as a frequency (EARFCN) that is a measurement target, measurement bandwidth and the like. The reporting configuration information includes a trigger of reporting (event based, periodic, or the like), measurement/report amount (RSRP, RSRQ and the like) and the like. The measurement ID is an ID for associating a measurement object with reporting configuration information. As events which become triggers for measurement reporting, there are, for example, event A1, event A2, event A3, event A4, event A5, event A6 and the like.

In the above-events, for example, the event A1 (Serving becomes better than threshold) is an event in which reporting is performed when reception quality (which is a general term for RSRP and RSRQ here) of a serving cell designated by the measurement configuration information becomes better than a predetermined threshold.

Figure 10:
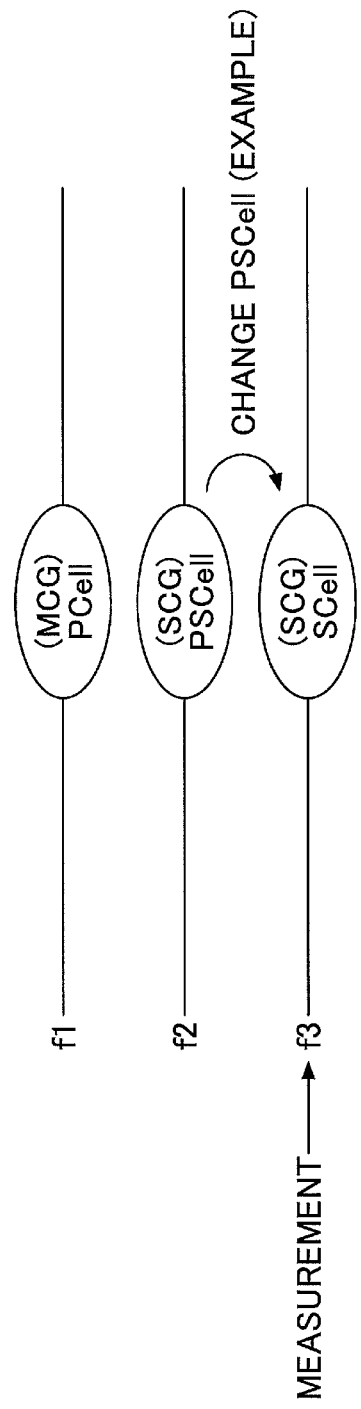
FIG. 10 is a diagram for explaining selection based on an event type in the determination example 1-2 in the determination control operation 1.

FIG. 10 is a diagram for explaining a usage example of an event A1. Here, it is assumed that Dual Connectivity is performed in which a PCell of an MCG is formed by a CC of a frequency f1, a PSCell of an SCG is formed by a CC of a frequency f2, and an SCell of an SCG is formed by a CC of a frequency f3. Since reception quality of the SCell (SCG) of the frequency f3 becomes better than a threshold, the user apparatus UE that receives measurement configuration information of the event A1 (frequency f3 is designated by a measurement object, for example) reports the cell to the MeNB, and the MeNB determines to perform change such that the PSCell is formed by the CC of the frequency f3, for example.

In the case of the event A1, since quality of a designated serving cell is measured, the user apparatus UE performs measurement using a measurement condition based on a CG that includes the serving cell. That is, in the example of the event A1 shown in FIG. 10, measurement is performed based on a state of the SCG. Note that the measurement here is measurement related to the event A1.

Also, for example, the event A3 (Neighbour becomes offset better than PCell) is an event to perform reporting when reception quality of a neighbor cell becomes better than reception quality of the PCell by an offset.

Since the event A3 is measurement for comparing reception quality of a neighbor cell and reception quality of a PCell, in the present embodiment, the user apparatus UE performs measurement using a measurement condition based on a state of a CG that includes the PCell. The measurement here is measurement related to the event A3. Even if the DRX/non-DRX state of a CG to which the PCell belongs is different from the DRX/non-DRX state of a CG to which the neighbor cell belongs, and if the frequency of the neighbor cell is the same as the frequency of the PSCell, measurement of the neighbor cell is based on the DRX/non-DRX state of a CG to which the PCell belongs. Since the purpose of the event A3 is to compare with the PCell, this is a control example that intends not to degrade from Rel-8 in terms of event reporting quality.

(Concrete Determination Example in Determination Control Operation 2)

Next, concrete determination examples are described in determination of step 202 of FIG. 7, that is, in the determination control operation 2 for determining a measurement condition using which CG's DRX configuration to follow for performing measurement when a plurality of DRX configurations are configured in the case where measurement is performed according to a measurement condition for when in DRX.

<Determination Example 2-1>

In the determination example 2-1, the user apparatus UE determines a measurement condition based on DRX configurations of all CGs to perform measurement using the measurement condition. For example, the user apparatus UE performs measurement based on a measurement condition that uses a DRX-cycle obtained by calculating "OR" of DRX-cycles of all CGs.

The definition of the above-mentioned "OR" is described with reference to FIG. 11. Note that this is an example. In FIG. 11, a DRX-cycle of an MCG is 640 ms, and a DRX-cycle of an SCG is also 640 ms, but, start points of the DRX-cycles are different as shown in the figure. Note that it is possible to obtain this difference from an offset and the like in DRX configurations.

As shown in FIG. 11, the period indicated by (1) from the start point of the DRX-cycle of the MCG to the start point of the DRX-cycle of the SCG, or the period indicated by (2) from the start point of the DRX-cycle of the SCG to the start point of the DRX-cycle of the MCG is used, in measurement using a measurement condition for when in DRX, as a DRX cycle in the measurement condition. Whether to use (1) or to use (2) can be determined, for example, as longer one/ shorter one. Also, an average between (1) and (2) may be used.

Although FIG. 11 shows a figure in which both of the MCG and the SCG are in an actual DRX state, determination in the present example is not dependent on the actual DRX state of the MCG and the SCG. For example, according to the determination control operation 1, there is a case to perform measurement that uses a measurement condition for when in DRX even if only one of the MCG and the SCG is in a DRX state. Even in such a case, (1) and/or (2) shown in FIG. 11 can be calculated based on both DRX configurations.

<Determination Example 2-2>

Next, the determination example 2-2 is described. In the determination example 2-2, the user apparatus UE performs measurement using a measurement condition based on based on a DRX configuration in a specific CG.

<Determination Example 2-2(a)>

Figures 12A, 12B, 12C:
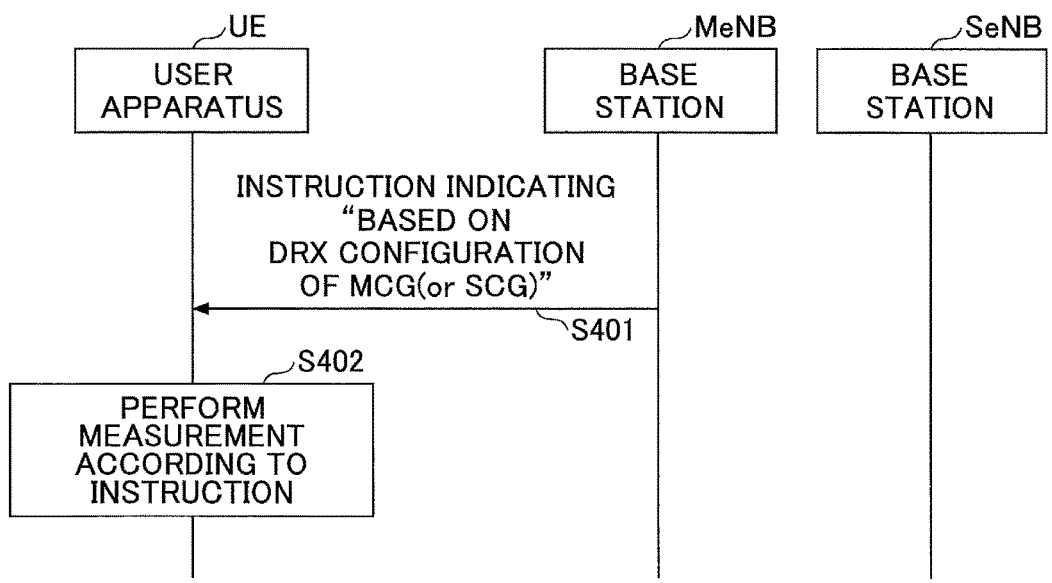
FIG. 12A is a diagram for explaining a determination example 2-2 in the determination control operation 2.
FIG. 12B is a diagram for explaining a determination example 2-2 in the determination control operation 2.
FIG. 12C is a diagram for explaining a determination example 2-2 in the determination control operation 2.

As shown in FIG. 12A, a rule is defined in a fixed manner, in which, for example, measurement is performed based on a measurement condition using a DRX configuration of an MCG, or, measurement is performed based on a measurement condition using a DRX configuration of an SCG, so that measurement is performed according to the rule. This method is advantageous in that determination control becomes easy.

<Determination Example 2-2(b)>

Also, the user apparatus UE may perform measurement based on a measurement condition using a DRX configuration of a CG designated from the NW. FIG. 12B is a sequence example in the case where instruction is performed from the MeNB. In step 401, the MeNB transmits, to the user apparatus UE, an instruction indicating which CG's DRX configuration to follow when performing measurement based on a measurement condition for when in DRX. In step 402, the user apparatus UE executes measurement according to the instruction. In FIG. 12B, as an example, although the instruction is transmitted from the MeNB, the instruction may be transmitted from the seNB.

The notification of the instruction may be performed semi-statically by an RRC signal, or may be dynamically performed by a MAC/PHY signal. When there is no instruction from the NW, the user apparatus UE may select a default CG (example: MCG) as shown in FIG. 12A.

<Determination Example 2-2 (c)>

Also, as shown in FIG. 12C, the user apparatus UE may perform measurement based on a measurement condition using a DRX configuration of a CG that matches a predetermined condition. Some concrete examples here are described below. Note that, an example in which determination is made based on a purpose of reporting as described later is an example for selecting a CG that matches a predetermined condition.

The user apparatus UE may perform measurement based on a measurement condition using a DRX configuration of a CG in which a specific DRX configuration is set. For example, the user apparatus UE performs measurement based on a measurement condition using a DRX-cycle in a CG of the longest (or shortest) DRX-cycle among a plurality of CGs.

Also, the user apparatus UE may perform measurement based on a measurement condition using a DRX configuration of a CG in which a specific bearer is set. For example, the user apparatus UE performs measurement based on a measurement condition using a DRX configuration of a CG that is configured with a bearer of the highest QoS among a plurality of CGs.

Also, the user apparatus UE may perform measurement based on a measurement condition using a DRX configuration of a CG in which the traffic amount is the largest among a plurality of CGs. As a calculation method of a traffic amount, a method similar to that described in the determination example 1-2(c) can be used.

Also, the user apparatus UE may perform measurement based on a measurement condition using a DRX configuration of a CG having a cell of the best quality (RSRQ, RSRP) among all CGs.

Also, the user apparatus UE may perform measurement based on a measurement condition using a DRX configuration of a CG that includes a specific cell. The specific cell may be, for example, a PCell, may be a specific SCell, or, may be a cell of a specific duplex mode (frame structure). The specific SCell is, for example, a PSCell, an SCell that is configured with a PUCCH, and the like. The specific duplex mode is TDD or FDD.

Also, the user apparatus UE may perform measurement based on a measurement condition using a DRX configuration of a CG that is configured first or a CG that is configured last.

Also, the user apparatus UE may perform measurement based on a measurement condition using a DRX configuration of a CG in a non-DRX state. When there are a plurality of CGs in a non-DRX state, a CG in which the non-DRX state continues for equal to or longer than a predetermined period may be selected. Also, at the time of determination, a CG in which the non-DRX state continues for the longest period may be selected.

Also, the user apparatus UE may perform measurement based on a measurement condition using a DRX configuration of a CG whose CG identifier (CG index) is the smallest/the largest. Note that, in the case where the number of CGs becomes equal to or greater than three, it is assumed that an identifier (CG index) is provided for each CG. Even when the number of CGs is two, an identifier (CG index) may be provided for each CG.

Also, the user apparatus UE may perform measurement based on a condition using a DRX configuration of a specific CG that is determined based on a purpose of reporting. As an example for performing determination based on a purpose of reporting, there is an example in which a CG is selected based on an event (Event) type.

As described before, for example, in the case of the event A1, since quality of a designated serving cell is measured, the user apparatus UE may perform measurement based on a measurement condition using a DRX configuration of a CG that includes the serving cell. Note that the measurement here is measurement related to the event A1.

Also, for example, since the event A3 is measurement for comparing reception quality of a neighbor cell and reception quality of a PCell, the user apparatus UE may perform measurement based on a measurement condition using a DRX configuration of a CG that includes the PCell. The measurement here is measurement related to the event A3. Even if the DRX configuration of a CG to which the PCell belongs is different from the DRX configuration of a CG to which the neighbor cell belongs, and if the frequency of the neighbor cell is the same as the frequency of the PSCell, measurement of the neighbor cell is based on the DRX configuration of a CG to which the PCell belongs. Since the purpose of the event A3 is to compare with the PCell, this is a control example that intends not to degrade from Rel-8 in terms of event reporting quality.

(Apparatus Configuration Example)

In the following, a configuration example of a user apparatus UE that can execute operation of the present embodiment including determination control operations 1 and 2 described so far is described.

Figure 13:
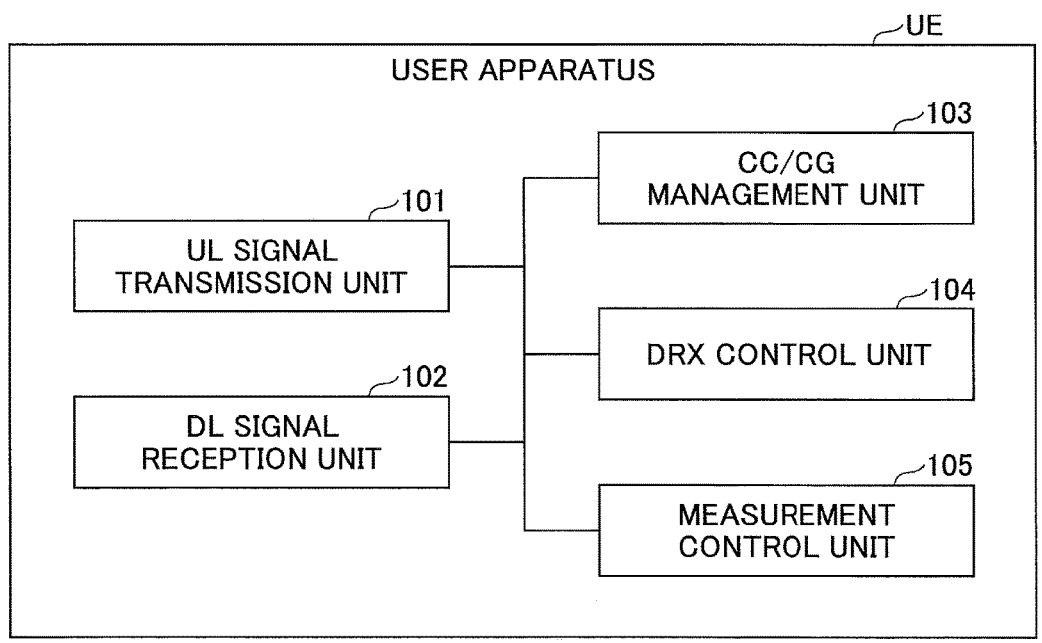
FIG. 13 is a block diagram of the user apparatus UE.

FIG. 13 shows a functional block diagram of the user apparatus UE in the present embodiment. As shown in FIG. 13, the user apparatus UE includes an UL signal transmission unit 101, a DL signal reception unit 102, a CC/CG management unit 103, a DRX control unit 104 and a measurement control unit 105. FIG. 13 only shows functional units especially related to the present invention in the user apparatus UE, and the user apparatus UE also includes at least functions, not shown in the figure, for performing operation complying with LTE. Also, the functional configuration shown in FIG. 13 is merely an example. Any function segmentations and any names of functional units can be used as long as the user apparatus UE can execute operation described in the present embodiment.

The UL signal transmission unit 101 includes a function configured to generate various physical layer signals from upper layer information that should be transmitted from the user apparatus UE to transmit the signals to the base station eNB. The DL signal reception unit 102 includes a function configured to receive various downlink signals from the base station eNB to obtain upper layer information from the received physical layer signals.

The CC/CG management unit 103 performs control on CA in the user apparatus UE such as management of a PCell and an SCell that form CA, addition/deletion of an SCell based on an instruction from the base station eNB, and Activation/Deactivation and the like. Also, the CC/CG management unit 103 includes a function configured to perform control of DC (MCG, SCG) and CA with SCell PUCCH (CA having an SCell in which PUCCH is configured).

The DRX control unit 104 receives a DRX configuration for each CG from the base station eNB, stores it in a memory and the like, and also performs operation of DRX for each CG according to the DRX configurations. The measurement control unit 105 executes determination operation including the determination control operations 1 and 2 described so far, and executes measurement based on a measurement condition (example: measurement condition described in the non-patent document 3) of content determined by the operation.

As described above, according to the present embodiment, there is provided a user apparatus for use in a mobile communication system, including:

determination means configured to determine whether the user apparatus can take both states of a discontinuous reception state and a non-discontinuous reception state at the same time; and measurement control means configured, if it is determined that the user apparatus can take both states of a discontinuous reception state and a non-discontinuous reception state at the same time by the determination means, to determine which measurement condition to use for performing measurement between a measurement condition for when in a discontinuous reception state and a measurement condition for when in a non-discontinuous reception state, and to perform measurement using a determined measurement condition. According to this configuration, it becomes possible to properly perform measurement even when the user apparatus takes both states of a discontinuous reception state and a non-discontinuous reception state.

In a case where the user apparatus communicates with a plurality of base stations each of which forms a cell group that includes one cell or a plurality of cells, and takes the same discontinuous reception state or non-discontinuous reception state between cells in each cell group, the measurement control means may be configured to determine which measurement condition to use for performing measurement between a measurement condition for when in a discontinuous reception state and a measurement condition for when in a non-discontinuous reception state based on states of all cell groups configured in the user apparatus. According to this configuration, since all cell groups are considered, measurement can be performed using a measurement condition in consideration of states of the whole cell groups.

In a case where the user apparatus communicates with a plurality of base stations each of which forms a cell group that includes one cell or a plurality of cells, and takes the same discontinuous reception state or non-discontinuous reception state between cells in each cell group, the measurement control means may be configured to determine which measurement condition to use for performing measurement between a measurement condition for when in a discontinuous reception state and a measurement condition for when in a non-discontinuous reception state based on a state of a specific cell group among cell groups configured in the user apparatus. According to this configuration, since a state of a specific cell group is used, for example, it becomes possible to perform measurement using a measurement condition suitable for a purpose (example: mobility).

For example, the specific cell group may be a predetermined cell group or a cell group that is notified from a base station of the plurality of base stations. By using the predetermined cell group, control is simplified, so that implementation becomes easy. By using the cell group that is notified from the base station, control from the base station can be considered.

The measurement control means may be configured to determine which measurement condition to use for performing measurement between a measurement condition for when in a discontinuous reception state and a measurement condition for when in a non-discontinuous reception state based on a type of an event in measurement configuration information notified from a base station of the plurality of base stations. According to this configuration, it becomes possible to perform measurement using a measurement condition suitable for the purpose of the event.

In a case where the user apparatus communicates with a plurality of base stations each of which forms a cell group that includes one cell or a plurality of cells, and takes the same discontinuous reception state or non-discontinuous reception state between cells in each cell group, the measurement control means may be configured to perform measurement using a measurement condition based on a discontinuous reception configuration of the plurality of cell groups if the measurement control means determines to perform measurement using a measurement condition for when in a discontinuous reception state. According to this configuration, in the case where measurement is performed by using a measurement condition for when in a discontinuous reception state, measurement can be performed by properly determining a measurement condition even when a plurality of discontinuous reception configurations are notified.

In a case where the user apparatus communicates with a plurality of base stations each of which forms a cell group that includes one cell or a plurality of cells, and takes the same discontinuous reception state or non-discontinuous reception state between cells in each cell group, the measurement control means may be configured to perform measurement using a measurement condition based on a discontinuous reception configuration of a specific cell group among the plurality of cell groups if the measurement control means determines to perform measurement using a measurement condition for when in a discontinuous reception state. According to this configuration, in a case where measurement is performed using a measurement condition for when discontinuous reception state, even when a plurality of discontinuous reception configurations are notified, measurement can be performed by properly determining a measurement condition. According to this configuration, since a discontinuous reception configuration of a specific cell group is used, for example, it becomes possible to perform measurement using a measurement condition suitable for a purpose (example: mobility).

The specific cell group may be a predetermined cell group or a cell group that is notified from a base station of the plurality of base stations. By using the predetermined cell group, control is simplified, so that implementation becomes easy. By using the cell group that is notified from the base station, control from the base station can be added.

The measurement control means may be configured to determine the specific cell group based on a type of an event in measurement configuration information notified from a base station of the plurality of base stations. According to this configuration, it becomes possible to perform measurement using a measurement condition suitable for the purpose of the event.

Also, according to the present embodiment, there is provided a measurement control method performed by a user apparatus for use in a mobile communication system, including:

a determination step of determining whether the user apparatus can take both states of a discontinuous reception state and a non-discontinuous reception state at the same time; and a measurement control step of, if it is determined that the user apparatus can take both states of a discontinuous reception state and a non-discontinuous reception state at the same time by the determination step, determining which measurement condition to use for performing measurement between a measurement condition for when in a discontinuous reception state and a measurement condition for when in a non-discontinuous reception state, and performing measurement using a determined measurement condition. According to this configuration, it becomes possible to properly perform measurement even when the user apparatus takes both states of a discontinuous reception state and a non-discontinuous reception state.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the embodiment of the present invention has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE has been explained by using the functional block diagrams. However, such an apparatus may be implemented in hardware (example: circuit), software, or a combination thereof.

Each of the software executed by a processor provided in the user apparatus UE according to an embodiment of the present invention and the software executed by a processor provided in the base station eNB may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-163987, filed in the JPO on Aug. 11, 2014, and the entire contents of the Japanese patent application No. 2014-163987 are incorporated herein by reference.

DESCRIPTION OF REFERENCE SIGNS eNB, MeNB, SeNB base station
UE user apparatus
101 UL signal transmission unit
102 DL signal reception unit
103 CC/CG management unit
104 DRX control unit
105 measurement control unit

The invention claimed is:

1. A user apparatus for use in a mobile communication system, the user apparatus comprising:
a processor configured to determine which measurement condition to use for performing measurement between a measurement condition for when in a discontinuous reception state and a measurement condition for when in a non-discontinuous reception state based on a state of a specific cell group among cell groups configured in the user apparatus, and to perform measurement using the determined measurement condition,
wherein the user apparatus communicates with a plurality of base stations each of which forms a cell group that includes one cell or a plurality of cells, and takes same discontinuous reception state or non-discontinuous reception state between cells in each cell group, and
wherein the specific cell group is a predetermined cell group or a cell group that is notified from a base station of the plurality of base stations.

2. The user apparatus as claimed in claim 1, wherein the processor is configured to determine which measurement condition to use for performing measurement between the measurement condition for when in the discontinuous reception state and the measurement condition for when in the non-discontinuous reception state based on a type of an event in measurement configuration information notified from a base station of the plurality of base stations.

3. A measurement control method performed by a user apparatus for use in a mobile communication system, the method comprising:
determining which measurement condition to use for performing measurement between a measurement condition for when in a discontinuous reception state and a measurement condition for when in a non-discontinuous reception state based on a state of a specific cell group among cell groups configured in the user apparatus, and performing measurement using a determined measurement condition,
wherein the user apparatus communicates with a plurality of base stations each of which forms a cell group that includes one cell or a plurality of cells, and takes same discontinuous reception state or non-discontinuous reception state between cells in each cell group, and
wherein the specific cell group is a predetermined cell group or a cell group that is notified from a base station of the plurality of base stations.

* * * * *